US011568596B2

(12) United States Patent
Patel

(10) Patent No.: US 11,568,596 B2
(45) Date of Patent: Jan. 31, 2023

(54) NON-BLOCKING TOKEN AUTHENTICATION CACHE

(71) Applicant: salesforce.com, inc., San Francisco, CA (US)

(72) Inventor: Noshirwan Dadabhoy Patel, Johns Creek, GA (US)

(73) Assignee: salesforce.com, inc., San Francisco, CA (US)

( * ) Notice: Subject to any disclaimer, the term of this patent is extended or adjusted under 35 U.S.C. 154(b) by 126 days.

(21) Appl. No.: 16/937,139

(22) Filed: Jul. 23, 2020

(65) Prior Publication Data

US 2022/0028160 A1 Jan. 27, 2022

(51) Int. Cl.
| | |
|---|---|
| *G06T 15/60* | (2006.01) |
| *G06T 15/20* | (2011.01) |
| *G06T 15/06* | (2011.01) |
| *G06T 7/90* | (2017.01) |

(Continued)

(52) U.S. Cl.
CPC .............. *G06T 15/60* (2013.01); *G06T 7/90* (2017.01); *G06T 15/06* (2013.01); *G06T 15/20* (2013.01); *H04L 9/32* (2013.01); *H04L 63/08* (2013.01); *H04L 63/0807* (2013.01); *G06T 2210/21* (2013.01); *G06T 2210/62* (2013.01)

(58) Field of Classification Search
CPC .......... G06T 15/60; G06T 7/90; G06T 15/06; G06T 15/20; G06T 2210/21; G06T 2210/62; H04L 9/32; H04L 63/08; H04L 63/0807
See application file for complete search history.

(56) References Cited

U.S. PATENT DOCUMENTS

2007/0288588 A1* 12/2007 Wein ................... H04L 67/1001
709/214
2011/0314533 A1* 12/2011 Austin .................... H04L 63/08
726/9

(Continued)

OTHER PUBLICATIONS

OAuth 2.0 Token Introspection, Richer, Oct. 2015; p. 1-18. (Year: 2015).*

(Continued)

*Primary Examiner* — Yonas A Bayou

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to a non-blocking token authentication cache. In various embodiments, a server computer system receives a request for service from a client device, with the request including an authentication token issued by an authentication service. The server computer system accesses a cache of previously received validation responses from the authentication service to determine whether one of the validation responses indicates that the authentication token has already been validated by the authentication service. In response to determining that the cache includes a validation response indicating that the authentication token has already been validated by the authentication service, the server computer system first provides a response to the request for service to the client device, and then contacts the authentication service to determine whether the authentication token is still valid.

19 Claims, 12 Drawing Sheets

(51) Int. Cl.
  *H04L 9/40*   (2022.01)
  *H04L 9/32*   (2006.01)

(56) References Cited

U.S. PATENT DOCUMENTS

| | | | |
|---|---|---|---|
| 2012/0174198 A1* | 7/2012 | Gould | H04L 63/0807 |
| | | | 726/6 |
| 2015/0032627 A1* | 1/2015 | Dill | H04L 9/32 |
| | | | 705/44 |
| 2015/0358328 A1* | 12/2015 | Kaplan | H04L 67/1095 |
| | | | 726/6 |
| 2018/0183812 A1* | 6/2018 | Maresca | H04L 63/08 |
| 2018/0278602 A1* | 9/2018 | Koushik | H04L 63/0853 |

OTHER PUBLICATIONS

J. Richer, "OAuth 2.0 Token Introspection," Internet Engineering Task Force (IETF), Request for Comments: 7662, Category: Standards Track, ISSN: 2070-1721, Oct. 2015, 4 pages.

\* cited by examiner

Cache 130

| | Client Id 335 | Username 336 | Token Name 337 | Expiration Timestamp 338 | TTL 134 |
|---|---|---|---|---|---|
| First Entry 133A | AbCD4321 | judyK | siYmzjQ7dx | 1437275890 | 1000070030 |
| Second Entry 133B | DEfg7639 | stevenP | caL37rnEp8 | 1437275872 | 1000070012 |

NON-BLOCKING TOKEN AUTHENTICATION CACHE

BACKGROUND

Technical Field

This disclosure relates generally to computer security, and, more specifically, to token-based authentication.

Description of the Related Art

When a client device makes a request for a particular service from a server system, it may provide an authentication token to the server system along with the request. The client device may obtain the authentication token from an authentication service by providing valid credentials—for example, a username and password—to the authentication service. In order to protect the security of the information and resources of the server system, the server system may verify the validity of the authentication token with the authentication service before accessing the resource. The validation is performed because the authentication service may revoke a previously granted authentication token at any time. In some cases, a request from the server system to the authentication system may incur a significant time penalty.

BRIEF DESCRIPTION OF THE DRAWINGS

FIG. 3 is a table of exemplary values for cache validation responses and TTL time periods.

Figure 1:
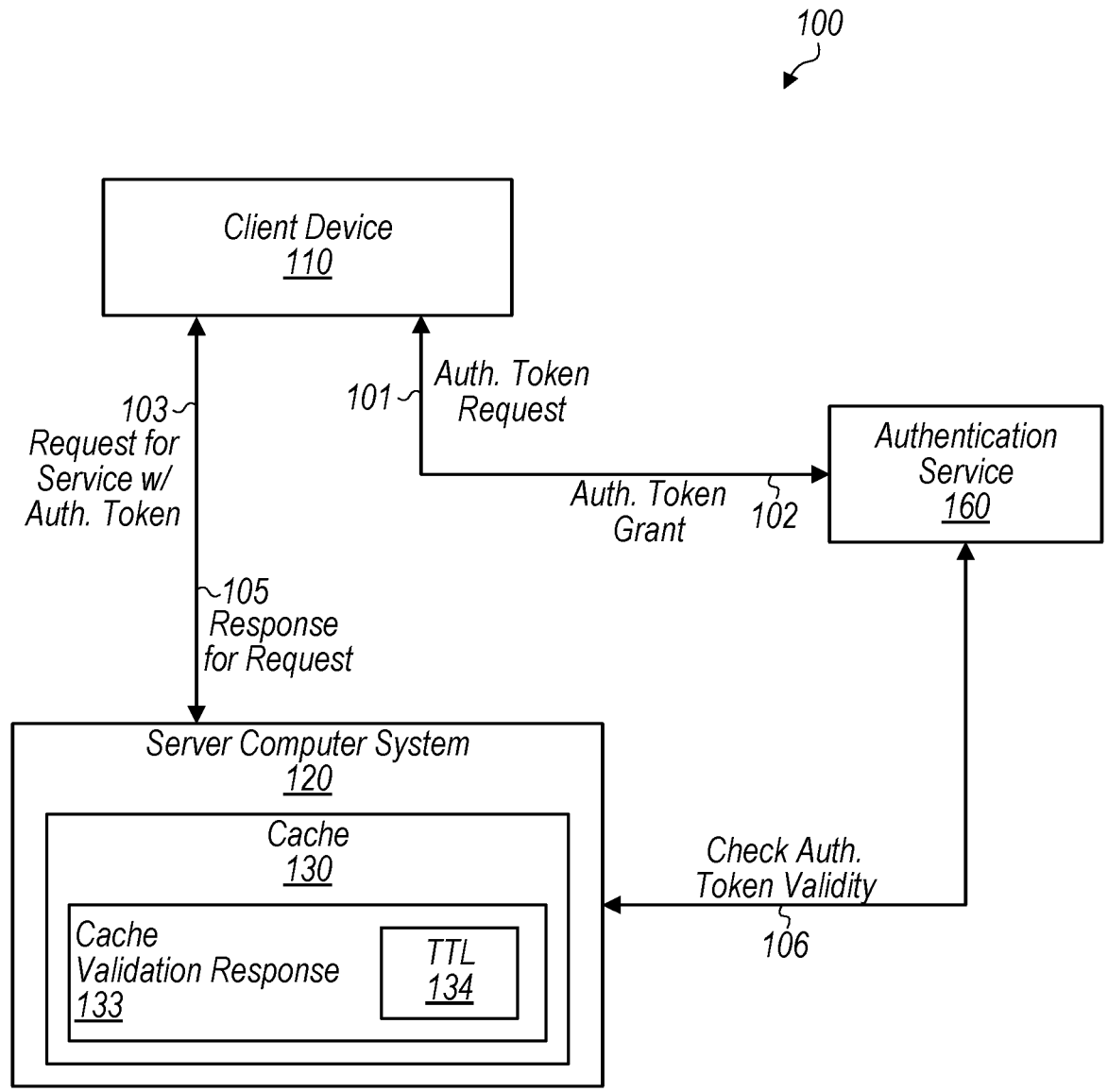
FIG. 1 is a block diagram illustrating example elements of a system for a non-blocking authentication cache.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "server computer system configured to provide services, such as data storage, data retrieval, and data manipulation" is intended to cover, for example, a computer system that has hardware (e.g., processors, memory storing program instructions, network interface card, etc.) that performs these functions during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, consider recitations of a "first authentication token" and a "second authentication token." The terms "first" and "second" are used merely to differentiate between two different authentication tokens, and do not connote, for example, that the "first" authentication token is earlier in time than the "second" authentication token.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A server system in a client-server architecture is often integrated with multiple other components in order to support high volumes of service requests. For example, a server system may receive high-volume requests from an automated process executing on a client device to push or pull data that may be stored on or accessible to the server system. There may be different credential systems that may be supported on different components of the client-server system. It is often desirable in such systems that one component respect the credential system of another component. In order to facilitate a cooperative system of sharing credential systems in a client-server architecture, there may be a centralized authentication service accessible to the multiple components that may grant authentication tokens to be shared among, and respected by, the multiple components.

As a server system may be communicating with multiple clients having multiple users, a server system may want to authenticate a user before enabling requested functionality or before granting access to some resource on the server system. Doing so improves the security of the system, since requests from only authorized users are handled to preserve access to what might often be proprietary information or resources on the server system. On some systems, this may take the form of the server system contacting the centralized authentication service to validate an authentication token presented to the server by the client, where the token corresponds to a user on the client. This contact incurs a latency that includes contacting, and receiving a validation response from, the authentication service. During the latency period, server systems may handle a large number of requests for service. Accordingly, the latency constitutes a significant performance penalty, especially if the latency is incurred with respect to many requests for service. The performance penalty may be accentuated in a scenario where a high volume of service requests is generated by an automated script executing on the client device. As used herein, the term "user" may refer either to a human actor using the client device (for example, a human using a browser on the client device) to communicate with the server system, or to a non-human automated script executing on the client device that communicates requests for service to the server system.

Authentication tokens are typically valid for a specified period of time (in some systems, a typical period of validity is a couple of hours) in order to reduce the potential exposure that can occur if an unauthorized actor obtains an authentication token. When this period of time ends, the token is said to "expire." Prior to this time of expiration, a token may be "revoked." Revocation allows the system to react to potential security events such as suspension of a user's credentials. Note that an authentication service may revoke a previously granted authentication token at any time, in a manner that may not be predictable for either the clients or the server system.

The present disclosure describes a non-blocking token authentication cache. In various embodiments, a server system maintains entries in a cache of validation responses. When the server system receives, from a client device, a request for service for a particular authentication token, the cache is accessed to determine if a valid entry exists for that token. If the cache has a valid entry, the server system responds to the client device immediately without having to incur a latency penalty to check with the authentication service to confirm that the particular token is valid. After or in parallel with this response to the client system, the server system can "revalidate" the particular token with the authentication service. This revalidation, however, does not cause the request for service to block.

The paradigm is premised on establishing a time-to-live (TTL) for validation responses (entries) in the cache. This value can be used to indicate whether a validation response is considered to be valid for a particular request for service. In general, a cache entry, once inserted into the cache is valid for some time period or "window," unless the entry is revalidated during that period/window. This time period, in some embodiments, is equal, or roughly equal (i.e., within 10%) of a token revocation "grace period." The grace period refers to a period of time during which it is acceptable for the server system to approve a request for service based on a cache entry after that token has been revoked by the authentication service. The grace period may be determined in some cases by system administrators based on trial and error or best security practices.

For example, if the system grace period is 30 seconds, and the TTL time window is also 30 seconds, then validation responses will then be valid in the cache, once inserted, for 30 seconds if there are no further accesses to the cache during this time period for the particular token. If, on the other hand, the server system receives a request for service for the particular token within the 30 seconds, then the request is approved, and the server system will check with the authentication service to make sure the particular token is still valid (that is, the token has not expired and has not been revoked). If the particular token is still valid, then the validation response for the particular authentication token is revalidated, such that the TTL time window is reset (in this example, to 30 more seconds). As long as the server system receives a request for service for the particular token within every grace period window, the validation response will remain valid in the cache, until the authentication service eventually indicates to the server system that the particular token is no longer valid (e.g., because the token has been revoked or has expired). Accordingly, the disclosed system uses the concept of an extendable TTL to allow the server system to provide increased security and responsiveness of handling authentication token revocations within the grace period. This approach reduces the impact of the latency associated with validating authentication tokens with the authentication service.

Turning now to FIG. 1, a block diagram of a system 100 for implementing a non-blocking authentication cache is shown. In the illustrated embodiment, system 100 includes a client device 110, a server computer system 120, and an authentication service 160. In some embodiments, system 100 may be implemented differently than illustrated. For example, authentication service 160 may be part of the server computer system 120, or the authentication service may be reachable by either or both of client device 110 and server computer system 120 through a wide-area network, more (or less) components may be included, etc.

Server computer system 120, in some embodiments, is a computing system that implements a platform allowing users to develop, run, and manage applications. As an example, server computer system 120 may be a cloud computing system that provides services to users of a sales or marketing automation and analytics application. In some embodiments, server computer system 120 may be a multi-tenant system that provides various functionality to a plurality of users/tenants hosted by the multi-tenant system. Accordingly, server computer system 120 may process requests from various, different users (e.g., providers and tenants of server computer system 120) as well as provide code, web pages, and other data to users. As depicted, server computer system 120 may interact with one or more client devices 110.

Client device 110, in various embodiments, is a computing device that allows a user of the client device 110 to access, store, and manipulate data that may be obtained from server computer system 120. Accordingly, client device 110 may include supporting software that allows operations (e.g., accessing, storing, displaying, etc.) on data generated or received by client device 110. Examples of a client device 110 include, but are not limited to, consumer devices such as a smartphone, a personal computer system, a desktop computer, laptop or notebook computer, mainframe computer system, tablet computer, handheld computer, workstation, network computer, a music player, or personal data assistant (PDA). Client device 110 may also include persistent storage, or may interface with a storage device or system (e.g., database or a cloud storage system) to facilitate persistent storage.

Authentication service 160, in various embodiments, is hardware, software, or a combination thereof capable of performing an authentication of the user of the client device 110. When a user of a client device 110 requests a grant of an authentication token from the authentication service 160, then a web page may be served on the client device 110 including an authentication prompt to the user to provide authentication credentials (for example, a username and password combination) to the authentication service 160. In response to a successful validation of the credentials of the user of the client device 110, the authentication service 160 may issue or grant an authentication token to the client device 110. In some embodiments, authentication service 160 may sign the authentication token with a private key of a public-key pair and may distribute the corresponding public key to the client device 110 to enable the client device 110 to verify the authentication token. In others embodiments, authentication service 160 may sign the authentication token using a keyed-hash (e.g., HMAC) and validate the token itself when requested by the server computer system 120.

As illustrated in FIG. 1, a user of the client device 110 sends an authentication token request 101 to the authentication service 160. The authentication service 160, subsequent to verifying user credentials presented by the user of the client device 110, responds to the client device 110 with an authentication token grant 102. Note that the authentication token has some expiration period during which the authentication token is valid (although the token may be revoked before the expiration period). This period (an example of which is several hours) may be stored at authentication service 160 and may not be known to server computer system 120 in some embodiments. The client device 110 then presents the authentication token received in the grant 102 to the server computer system 120, along with or as part of a request for service 103. Server computer system 120 accesses a cache 130 to determine whether the cache includes a valid previously received validation response 133 from authentication service 160 that corresponds to the authentication token. Note that the validity of the authentication token is separate from the validity of the validation response for the token that is stored in the cache. The former concept corresponds to the expiration period noted above (and is also affected by token revocation), while the latter concept is discussed in the next paragraph. In short, if cache 130 includes a valid validation response 133 for the authentication token presented by the user, server computer system 120 may be able to approve the request for service without having to incur the latency of checking with authentication service 160 before responding.

As noted, an authentication token has some period of validity that may be set by authentication service 160. An exemplary period of validity may be two hours. But an authentication token may be revoked by authentication service 160 prior to the initially set period of validity. One example when this might occur is when a user's privileges are revoked (e.g., on job termination). Accordingly, the use of cache 130 to approve requests for service without first contacting authentication service 160 presents a potential security issue since requests for service might be approved based on expired authentication tokens. The present disclosure, however, addresses this issue via the notion of validity of validation responses stored in cache 130. In various embodiments, the validation responses in cache 130 each have a "time-to-live" (TTL) field 134 that can be used to define a TTL time period, which is typically shorter than an expected expiration period for an authentication token. For example, whereas an authentication token may initially be set to expire in two hours, a TTL may be initially set to 30 seconds. Once a validation response is inserted into cache 130, any subsequent request for service that occurs within the TTL time period (e.g., 30 seconds from initial insertion) can be approved without first checking with authentication service 160. Moreover, that subsequent access to the validation response in cache 130 may also reset the TTL time period, such that the validation response remains in cache 130 for a further TTL time period. An entry may thus remain in cache 130 until 1) a time period longer than the TTL time period passes without an access to that validation response in cache 130, or 2) the validation response is determined to be invalid based on receiving information from authentication service 160 indicating that the authentication token in that validation response has been revoked or is expired.

As noted, the initial TTL time period may correspond to a "grace period" for tokens during which it is deemed permissible for server computer system 120 to approve a request for service based on an authentication token that has been revoked by authentication service 160. To clarify, authentication service 160 may revoke an authentication token at any time. The present disclosure describes a paradigm, however, in which server computer system 120, which may be geographically separate from authentication service 160, can approve requests for service without first checking with authentication service 160 to see if the underlying authentication token is valid. In order to reconcile the performance benefits of this paradigm with the security concerns of using revoked tokens, validation responses in cache 130 are valid only for this grace period. Thus, as long as a particular validation response in cache 130 is accessed at least once during successive grace-period-length windows (e.g., every 30 seconds), the validation response will remain valid. This process is referred to as "revalidation" of the validation response.

Eventually, however, the underlying authentication token in the validation response will expire or be revoked. Accordingly, when a request for service corresponds to a valid validation response (and is thus approved without first rechecking with authentication service 160), server computer system 120 will communicate with authentication service 160 to make sure that the underlying authentication token is still valid. This communication may be performed after approval of the request for service, or in parallel with the approval, in various embodiments. In this manner, client device 110 receives approval of the request for service without suffering the latency penalty of the communication with authentication service 160. The situation may thus arise in which a request for service is approved because of a valid validation response in cache 130, but the resulting communication to authentication service 160 finds that the underlying authentication token has been revoked. The approval of the request for service does not present a security issue, however, if the maximum length of time an entry can reside in cache 130 without revalidation is less than or equal to the system grace period for authentication tokens. (Note that once an authentication token is found to be revoked, the validation response in cache 130 is updated such that it is no longer valid.)

Note that the grace period may, in many cases, be a system parameter that is decided upon during design time, or through trial and error. For example, if it is determined that it is permissible that a request for service to be approved based on a token that has only been revoked during the preceding 30 seconds, then 30 seconds is the grace period of the system. In some embodiments, the grace period might change over time, either in response to system administrator input, or dynamically based on some automatically executing process. It is thus desirable in many cases for the initial time period corresponding to the grace period to be relatively short as compared to the typical expiration period of an authentication token. The TTL period for cache entries can also be set to be shorter than the grace period in some embodiments.

The techniques illustrated in FIG. 1 allow server computer system 120 to balance the concerns of keeping a relatively short TTL time period for the validity of authentication tokens for increased security and responsiveness in handling revocations of tokens, while providing a mechanism to minimize the latency associated with validating the authentication token during the processing of the request for service 103 received from the client device 110. Since the cache of previous validation responses 133 received for a particular authentication token is valid up to a TTL time period from the time of receiving the last validation response for the particular token, any further requests received from the client device 110 within the TTL time period may be processed by server computer system 120 without having to check with the authentication service 160 for validity 106 of the authentication token. This provides the advantage of not having to incur the latency penalty of communicating with authentication service 160. Upon determining that the token is still valid, the techniques of the present disclosure enable the TTL to be extended for another time period, which may be equal to the token revocation grace period, so that the performance benefit of no latency is available for subsequent requests, as long as those requests are received within a time period less than the TTL time period from the last request. Under this paradigm, a cache validation response is evicted (or marked as invalid) upon the expiration of a TTL time period when there is no query to that validation response in the cache for a period of time longer than the TTL time period. Accordingly, there is no acceptance or use of an authentication token that has been revoked for a time period longer than the grace period.

Various examples involving the use of cached validation responses to enable a non-blocking authentication cache implementation will now be discussed in more detail with respect to FIG. 2 and the following figures. Initially, the modules that may be implemented within server computer system 120 in various embodiments will be discussed with respect to FIG. 2.

Figure 2:
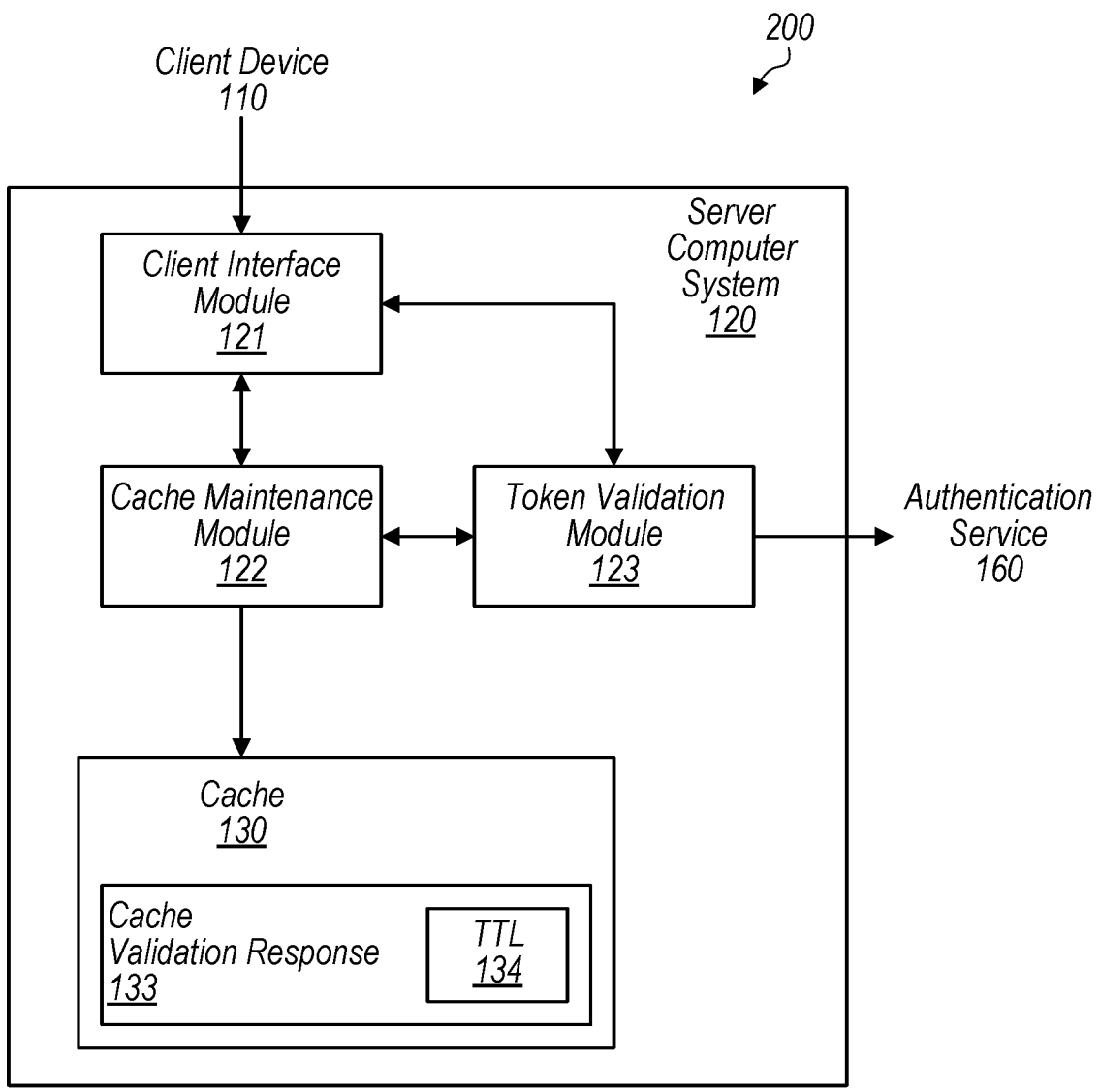
FIG. 2 is a block diagram illustrating exemplary modules of an embodiment of a server computer system.

Turning now to FIG. 2, a block diagram 200 of exemplary modules that could be implemented within server computer system 120 is shown. In the illustrated embodiment, server computer system 120 includes a client interface module 121, a token validation module 122, a cache maintenance module 123, and a cache 130. As further illustrated, the cache 130 may store validation responses or entries 133 that include a value of TTL field 134 for each authentication token that is associated with a request for service handled by the server computer system 120. In some embodiments, server computer system 120 may be implemented differently than illustrated, with more (or less) components being included. For example, in one embodiment, one or more of the modules: client interface module 121, token validation module 122, and cache maintenance module 123 may be implemented as a single module encompassing the functionalities of all the modules. In some embodiments, the cache 130 may store the TTL 134 as part of the validation response 133. In some other embodiments, the expiration timestamp in the validation response 133 may be omitted.

Client interface module 121 is a software module that handles interfacing of server computer system 120 with one or more client device(s) 110. Client interface module 121 receives a request for service 103 from a client device 110, and determines, by accessing the cache 130, whether an entry exists for the authentication token in cache 130. In one embodiment, if a cache entry exists, then client interface module 121 handles the request for service 103 by providing access to a resource used to handle the request, or by enabling a functionality on server computer system 120 that is used to handle the request. Client interface module 121 returns a response for request 105 to the client device 110 at the end of handling the request for service 103. In some other embodiments, if an entry does not exist in cache 130 for the authentication token, then client interface module 121 interfaces with token validation module 122 to find out whether the authentication token is valid. In such embodiments, client interface module 121 proceeds with handling the request for service 103 only after receiving a positive response from token validation module 122 that the authentication token is still valid.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

The token validation module 122 is a software module that handles the interaction of server computer system 120 with the centralized authentication service 160. In one embodiment, client interface module 121 communicates with token validation module 122 upon not finding an entry in the cache 130 corresponding to the authentication token associated with the request for service 103. In some other embodiments, client interface module 121 communicates with token validation module 122 after handling the request for service 103 upon finding an entry in the cache 130 for the authentication token in the request. Token validation module 122 then interfaces with the authentication service 160 to check the validity of the authentication token provided to it. In one embodiment, the authentication service 160 indicates that the authentication token is valid by providing a validation response, and optionally include a TTL (either separately, or as part of the validation response). In some other embodiments, authentications service 160 indicates that the authentication token is valid without including an expiration timestamp in the validation response. In some embodiment, token validation module 122 communicates the status of validity of the authentication token (based on the response received from authentication service 160) to client interface module 121, and also to cache maintenance module 123 (discussed below).

Cache maintenance module 123 is a software module that handles the management of cache 130 with regards to populating and evicting cache validation responses 133 and updating TTL 134 for each authentication token that is associated with a request for service 103 from the client device 110. In one embodiment, cache maintenance module 123 receives a validation response from token validation module 122 that indicates that the authentication token is still valid, and the response additionally includes a TTL. In one embodiment, upon receiving an indication of continued validity of the authentication token in cache 130, cache maintenance module 123 extends (or alternatively, resets) the TTL time period for the cache entry. In one embodiment, cache maintenance module 123 copies the respective fields from the response into the fields of validation response 133 in cache 130. In some other embodiments, the communication from token validation module 122 may not include the TTL. In such an embodiment, cache maintenance module 123 may store the current timestamp of receiving the communication from the token validation module 122 into the TTL field 134 of the cache 130. In some other embodiments, token validation module 122 indicates to cache maintenance module 123 that a particular authentication token is not valid (either because the authentication token has expired, or because the authentication token has been revoked). In such embodiments, cache maintenance module 123 evicts the entry for the particular authentication token from the cache, either at that time or during subsequent cache maintenance. In one embodiment, eviction may be indicated by inserting an appropriate value into a field of the cache entry (e.g., TTL 134).

In some embodiments, client interface module 121 compares the time associated with receiving a request for service 103 with a value in TTL field 134 stored in the cache 130. This comparison can be used to assess whether the validation response is currently valid. There are various ways of accomplishing this. In one embodiment, when a cache entry is inserted into cache 130 (or revalidated), the current timestamp is written into TTL field 134. When the entry is later accessed, it can be determined whether the new time of access is within the TTL time period (e.g., 30 seconds) from the value in the cache. If so, the entry is valid. Alternately, when a cache entry is inserted (or revalidated), the time of expiration (i.e., current time plus TTL time period) is written to TTL field 134. In this implementation, the time of subsequent access can be compared with the time of expiration to determine entry validity. As a further possibility, a TTL written to the cache entry may be updated (e.g., decremented) periodically until it finally indicates invalidity.

Turning now to FIG. 3, an example 300 illustrating entries in cache 130 is shown. As depicted, validation responses 133A-B include a number of fields. These fields include TTL 134, client id 335, username 336, token name 337, and expiration timestamp 338. The client id field 335 is associated with a particular client device 110, while the username field 336 indicates a particular user associated with system 100, and these fields may be used as part of an authentication procedure to access cache 130. Thus user "judyK" may be permitted access to entry 133A, but not entry 133B. The token name field 337 indicates a particular token associated with the entry. Accordingly, token "siYmzjQ7dx," when presented to cache 130, will only match entries having that token name.

In some embodiments, validation responses may include, in field 338, a value for an expiration of the token—a value that may be set, for example, upon a token first being provisioned by authentication service 160. When cache 130 includes an expiration timestamp field 338, a cache hit may be returned only if a value in field 338 has not been exceeded. For example, consider a time value corresponding to timestamp 1437275880. This time value, if presented to cache 130, would (assuming all other relevant fields match) permit a match for entry 133A but not entry 133B, since the token for the former, but not the latter, entry is unexpired. In this scenario, system 100 may distinguish between a token expiration and token revocation, in that the former may be known upon token provisioning, while the latter is unpredictable. Thus, in those embodiments in which entries 133 in cache 130 include expiration timestamps for field 338, a cache hit does not occur if field 338 indicates expiration.

But a non-expired token does not mean the entry is necessarily valid. Entry 133 must also be valid. This is determined by the value of field 134—the time-to-live value. As noted above, there are various ways to use field 134. In the illustrated embodiment, the value in field 134 indicates a timestamp after which the entry is not valid. Thus, if accesses to entries 133A and 133B are both presented to cache 130 at a time corresponding to timestamp 1000070018, entry 133A, whose timestamp is greater than 1000070018, would be valid, but entry 133B, whose timestamp is less than 1000070018, would not be valid.

Of course, as previously noted, a cache hit does not guarantee that the token is actually still valid according to authentication service 160. But under the disclosed paradigm, a cache hit permits request for service 103 to proceed while server computer system 120 checks with authentication service 160 to see if the token has been revoked within the grace period.

In other embodiments, cache entries 133 may not include an expiration timestamp field 338. In these embodiments, cache 130 does not distinguish between revocation and expiration. In these implementations, a cache hit is premised on a comparison involving a value in TTL field 134. These implementations allow use of both expired and revoked tokens for the token revocation grace period.

Figure 4A:
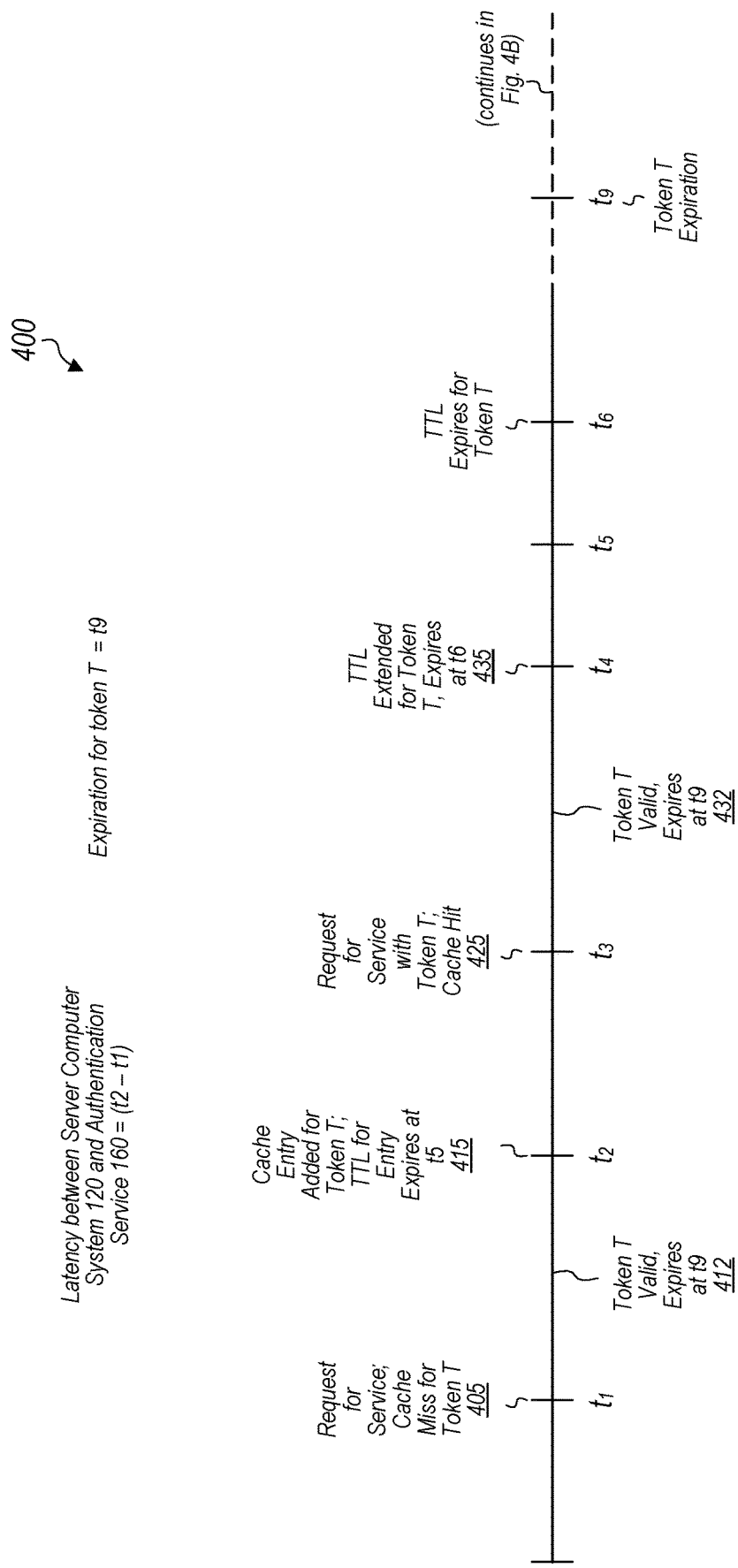
FIG. 4A-B are example timeline diagrams illustrating extensions of a TTL period to minimize latency in the non-blocking cache implementation.
Figure 4B:
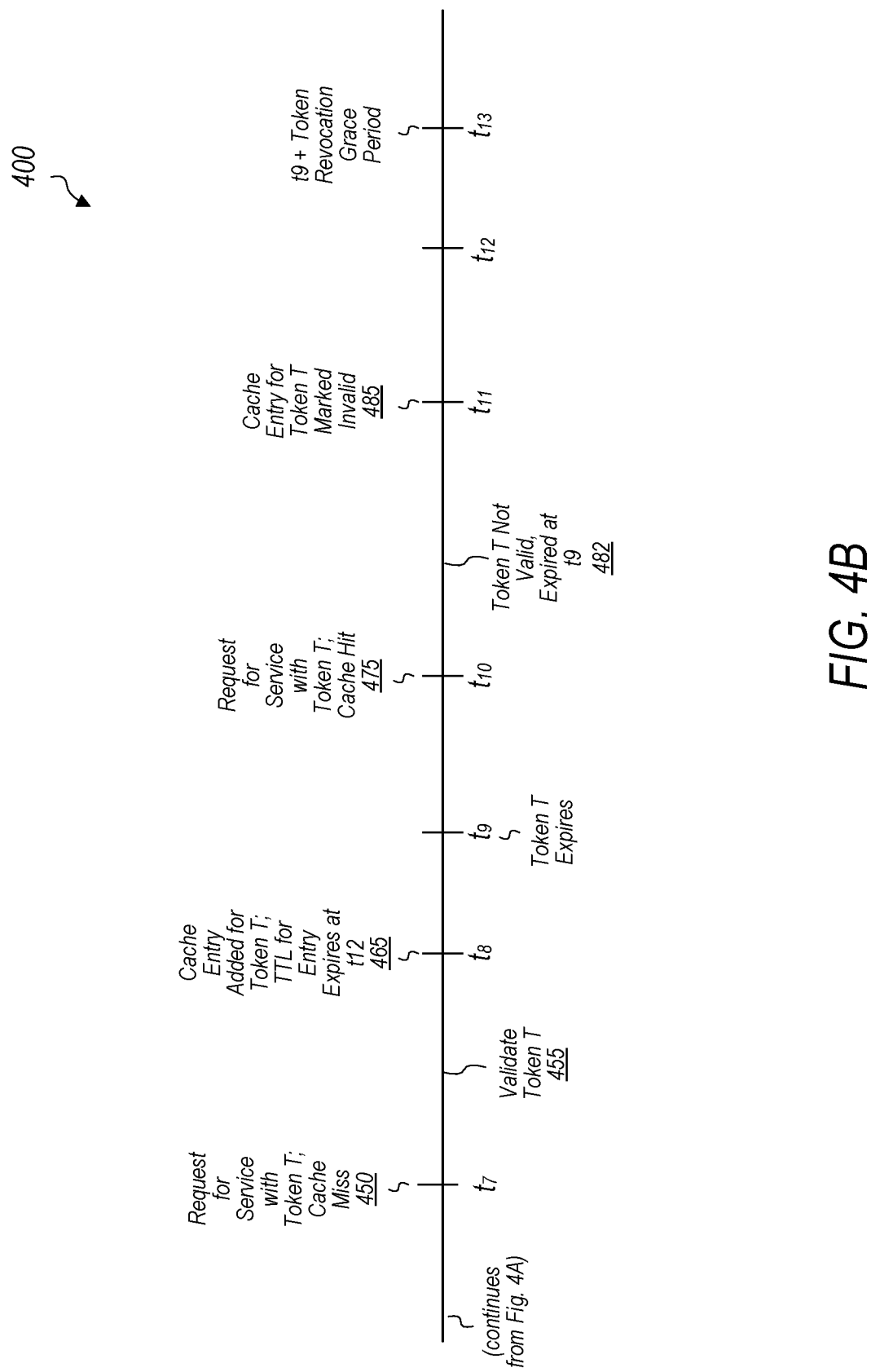

With this understanding of exemplary layouts of cache 130, various examples of the operation of system 100 are now discussed, starting with FIGS. 4A-B, which illustrate repeated use of the TTL field to keep an entry valid in cache 130.

Turning now to FIG. 4A, an example timeline diagram 400 illustrating extensions of a TTL period to minimize latency in the non-blocking cache implementation is shown. Actions indicated above the timeline are those taken by server computer system 120, including cache 130. Actions indicated below the timeline, on the other hand, are those taken at authentication service 160.

At time $t_1$, a request for service 405 is received by server computer system 120. Request 405 is associated with an authentication token T, and results in a cache miss. The cache miss results in a delay (whose latency corresponds to the difference between time $t_1$ and time $t_2$) being incurred while the server computer system communicates with authentication service 160.

Sometime before time $t_2$, authentication token T is validated by authentication service 160, as indicated by reference numeral 412. The expiration of token T corresponds to time $t_9$. The value of $t_9$ may or may not be provided to server computer system 120, depending on the embodiment. This result from authentication service 160 is returned to server computer system 120 at time $t_2$, as indicated by reference numeral 415. At time $t_2$, the cache entry for token T is added to the cache, with the TTL period set to be equal to a particular time window, which may be the token revocation grace period. In the illustrated timeline, the new cache entry is set to expire at time $t_5$.

At time $t_3$, another request for service associated with token T is received by the server computer system. This request is before the expiration of the TTL period (i.e., $t_5$). This results in a cache hit 425 for token T. The request is handled at time $t_3$ without incurring a latency for validation of the authentication token. Also, at time $t_3$, the authentication service is contacted to revalidate the token T. The term "revalidate a token" as used herein refers to the action of contacting the authentication service to verify that a token for which there was a cache hit is still valid at the authentication service.

Sometime before $t_4$, the authentication service indicates token T is valid, as indicated by reference numeral 432. At time $t_4$, this result is returned to the server computer system, causing the value of the TTL field for the cache entry for token T to be extended. When the authentication service indicates that the token T is still valid, Token T is revalidated, such that the cache entry corresponding to token T continues to be valid in the cache. In the illustrated timeline, the cache entry is now set to expire at time $t_6$, as indicated by reference numeral 435. Note that $t_6$ may equal $t_4$ plus the token revocation grace period or any other suitable TTL time period.

At time $t_6$, the TTL for token T expires since there has been no access since $t_3$, which is an interval longer than the TTL time period. Accordingly, the cache entry is marked to be invalid. In various embodiments, the entry may be immediately evicted or at a later time. Further description of timeline 400 continues with the description of FIG. 4B.

Turning now to FIG. 4B, at time $t_7$, another request for service associated with token T is received. This results in a cache miss, as indicated by reference numeral 450. Sometime before time $t_8$, token T is validated at the authentication service, as indicated by reference numeral 455. This result is communicated to the server computer system at time $t_8$, as shown by reference numeral 465. Upon receiving this result, an entry for token T is again added to the cache. A TTL value may also be added that is set to expire at time $t_{12}$, which is after expiration time $t_9$. (In this embodiment, cache 130 does not have any knowledge of the expiration time of token T.) A further request for service arrives at time $t_{10}$ (reference numeral 475). This request is within the window between time $t_9$ (token expiration) and time $t_{12}$, which is equal in duration to the token revocation grace period, which ends at time $t_{13}$. Subsequently and prior to time $t_{11}$, the authentication service receives the revalidation request and indicates the token is now expired (reference numeral 482). This information is received by the server computer system at time $t_{11}$ (reference numeral 485), causing the cache entry to be marked invalid. Accordingly, FIG. 4B illustrates that a request for service may be approved within a grace period even though the underlying token has actually expired.

The example timeline of FIGS. 4A-B demonstrate the performance benefits of a non-blocking token authentication cache. As noted, the TTL period may be relatively short compared to a typical token expiration period. Strictly by way of illustration, the relationship between the grace period/initial TTL and the expiration timestamp may be compared using a ratio. For example, in some cases, the length of time defined by the TTL period may be less than one percent of the value of the time period defined by the expiration timestamp. Thus, if the authentication token is originally set to be valid for two hours (7200 seconds) and the TTL period is 30 seconds, the latter time period is less than one percent of the former time period. In some other embodiments, the relationship between the two values may differ—for example, this ratio may be less than two percent, less than five percent, less than ten percent, etc. In some embodiments, the relationship may be a configurable parameter of the system 100. Alternatively, it may simply be the case that the grace period is one minute or less, regardless of the expected length of validity of authentication tokens.

Figure 5A:
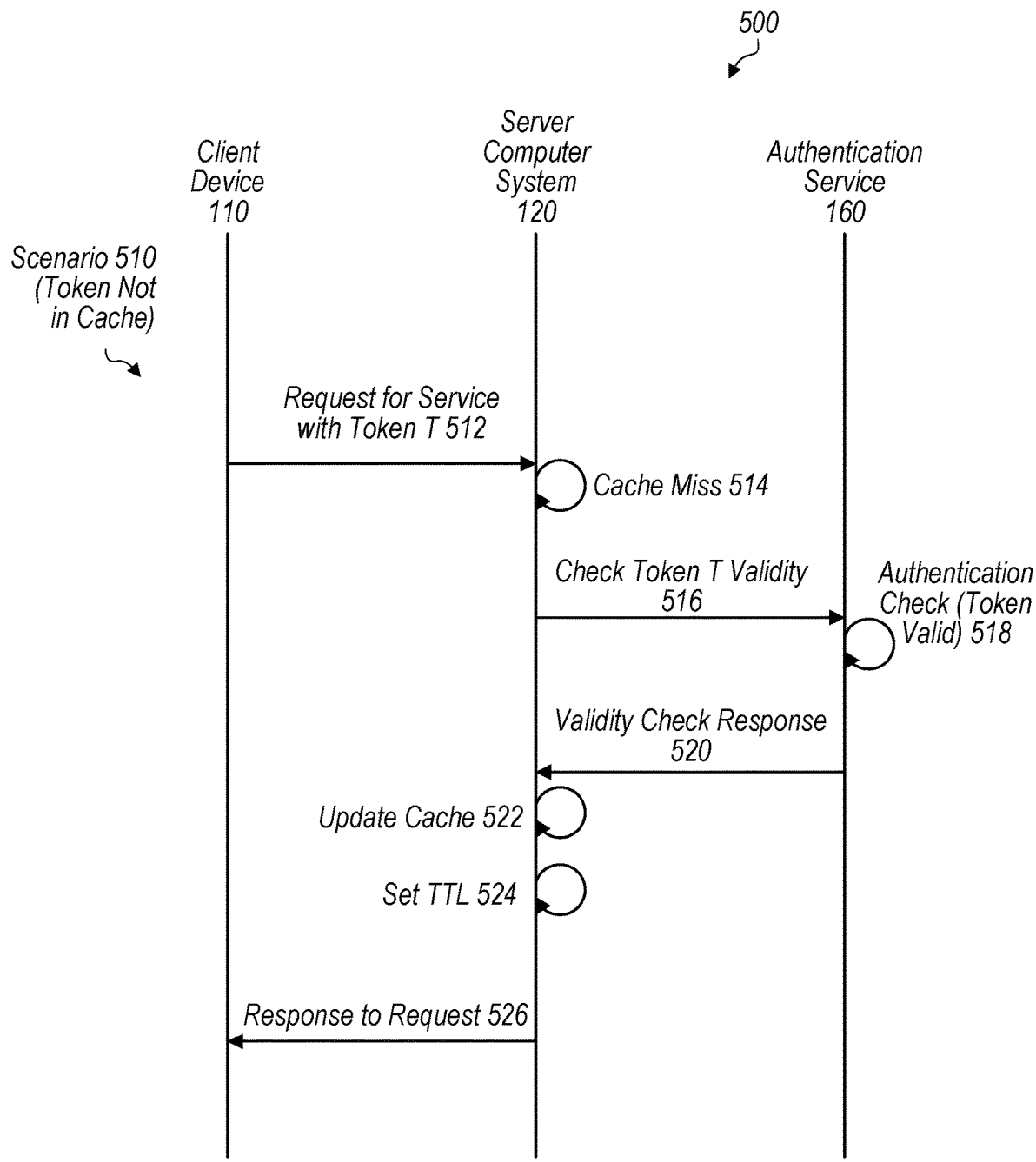
FIGS. 5A-C are message sequence charts illustrating interactions between the various system components.

Turning now to FIG. 5A, a message sequence chart 500 illustrating the interaction between the various components of system 100 is shown. In the illustrated embodiment, the interactions are depicted between a client device (e.g., client device 110), a server computer system (e.g., server computer system 120), and an authentication service (e.g., authentication service 160) for a scenario 510 in which an authentication token in a request for service is not present in cache 130.

At step 512, a request for service (e.g., request for service 103) is sent by the client device to the server computer system, with an authentication token T included with the request. At step 514, there is a cache miss. Hence, the server computer system incurs a latency to validate authentication token T with the authentication service. At step 516, the server computer system checks the validity of the token T with the authentication service. At step 518, the authentication service performs an authentication check for the authentication token T, and determines that the authentication token T is valid. At step 520, the authentication service responds to the server computer system, indicating that the authentication token T is valid. At step 522, the server computer system updates the cache by adding an entry corresponding to the authentication token T in the cache. At step 524, the server computer system sets a TTL value for the authentication token T in the cache. This may be substantially equal to the token revocation grace period in some implementations. At step 526, the server computer system sends a response for the request (e.g., response to request 105) to complete the handling of the request for service.

Figure 5B:
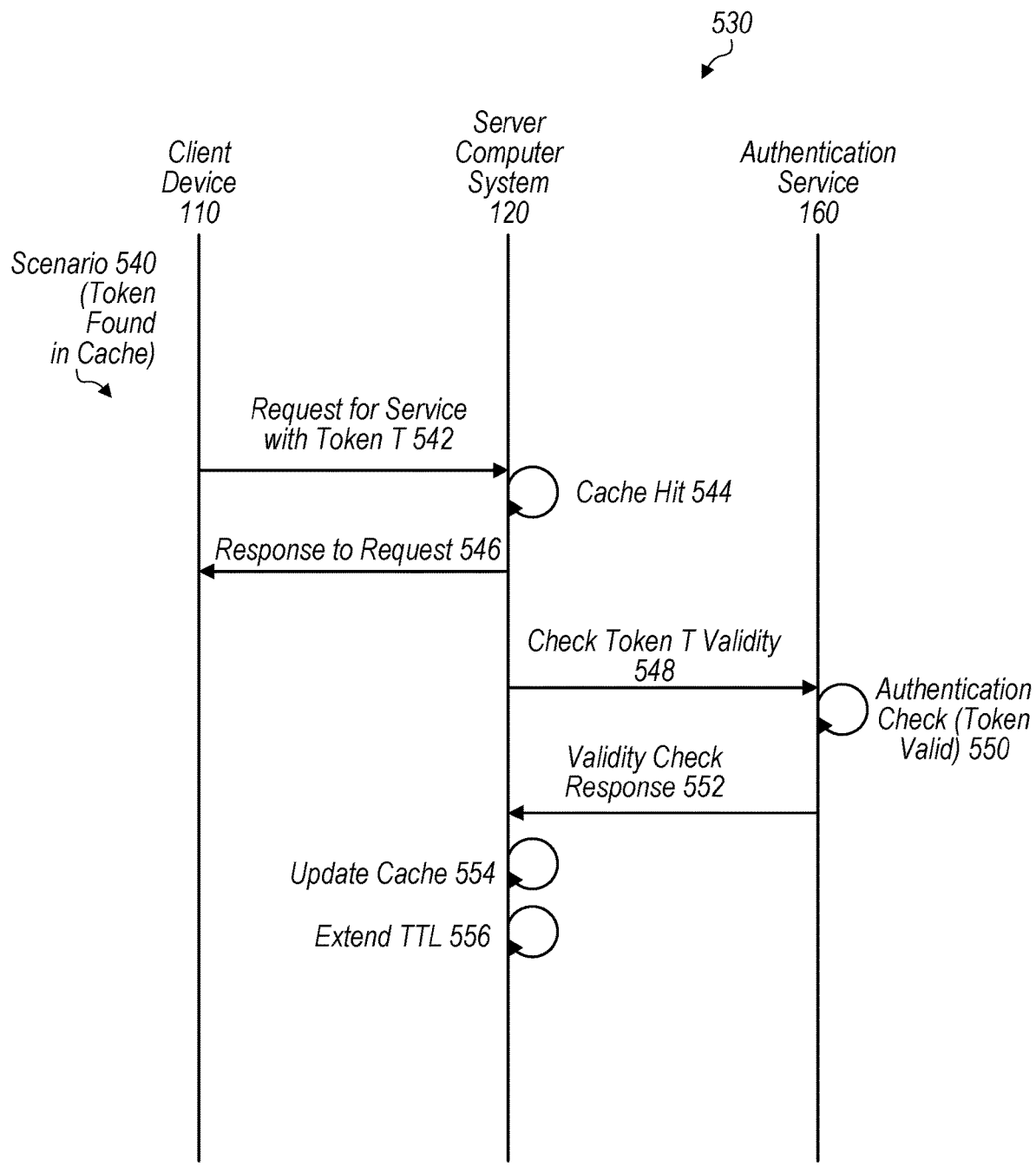

Turning now to FIG. 5B, a message sequence chart 530 illustrating the interaction between the various components of system 100 is shown. In the illustrated embodiment, the interactions are depicted between a client device (e.g., client device 110), a server computer system (e.g., server computer system 120), and an authentication service (e.g., authentication service 160) for a scenario 540, in which there is a cache hit in response to a request for service.

At step 542, a request for service (e.g., request for service 103) is sent by the client device to the server computer system. At step 544, there is a cache hit. Due to the cache hit, the server computer system does not incur a latency for a validation of the authentication token T with the authentication service before processing the request for service. At step 546, the server computer system sends a response for request 105 to complete the handling of the request for service.

After processing the request for service (or in parallel with this action), the server computer system then checks the validity of the token T with the authentication service in step 548. At step 550, the authentication service performs an authentication check for the authentication token T, and determines that the authentication token T is valid. At step 552, the authentication service responds to the server computer system, indicating that token T is valid. At step 554, in some embodiments, the server computer system updates the cache by overwriting the validation response in the cache with the response from the authentication service corresponding to the authentication token T in the cache. At step 556, the server computer system extends the TTL value for the authentication token T in the cache. This extension may be equal or substantially equal to the token revocation grace period in some implementations.

Figure 5C:
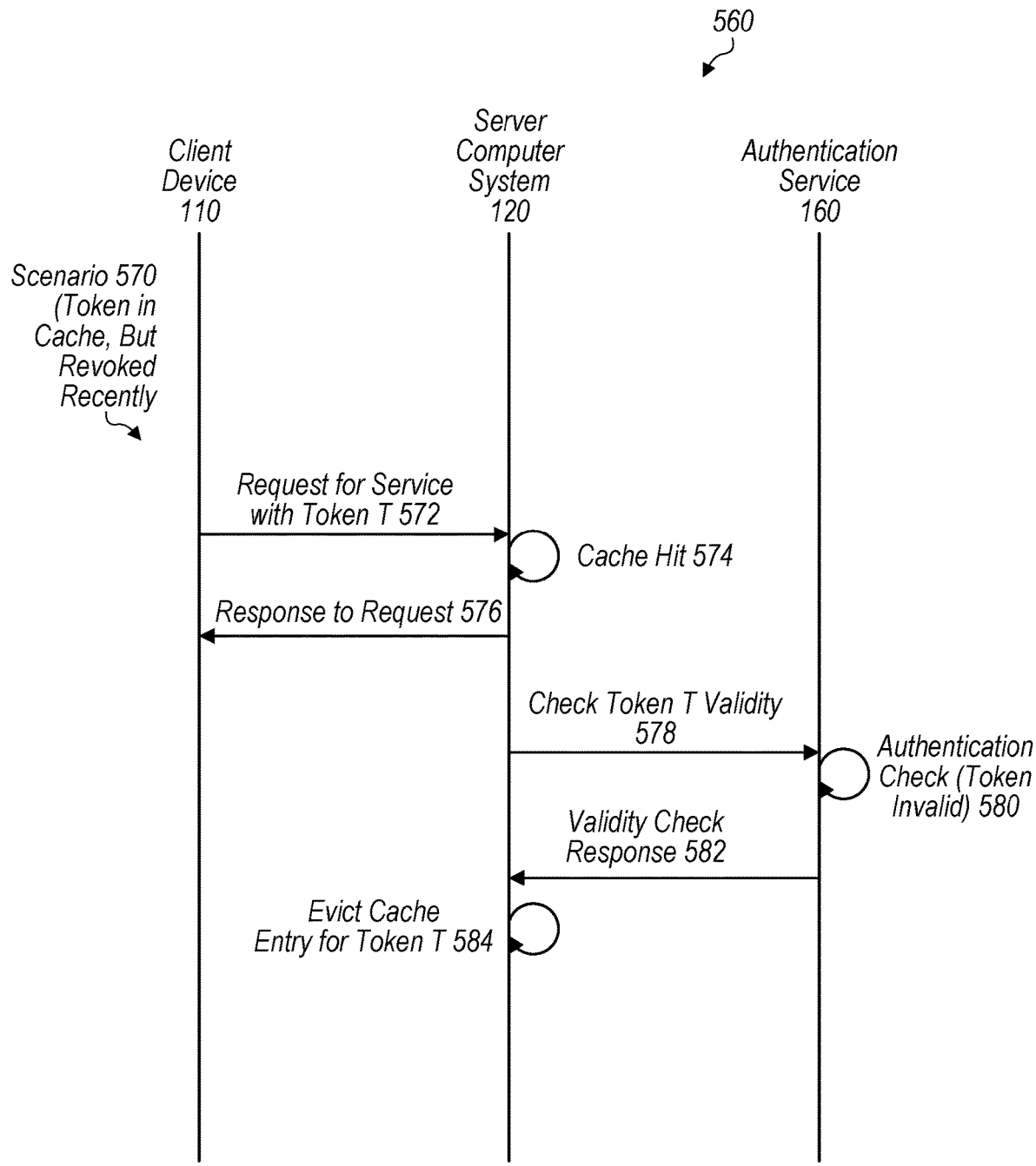

Turning now to FIG. 5C, a message sequence chart 560 illustrating the interaction between the various components of system 100 is shown. In the illustrated embodiment, the interactions are depicted between a client device (e.g., client device 110), a server computer system (e.g., server computer system 120), and an authentication service (e.g., authentication service 160) for a scenario 570, in which there is a cache hit for an authentication token that has recently been revoked.

At step 572, a request for service is sent by the client device to the server computer system. At step 574, there is a cache hit. At step 576, the server computer system sends a response for the request to complete the handling of the request for service.

After processing the request for service (or in parallel with this action), the server computer system then checks the validity of the token T in step 578. At step 580, the authentication service performs an authentication check for the authentication token T, and determines that the authentication token T is invalid (in one embodiment, the token T is invalid because the token T has been revoked). At step 582, the authentication service responds to the server computer system, indicating that token T is invalid. At step 584, the server computer system marks the cache entry for eviction.

Figure 6:
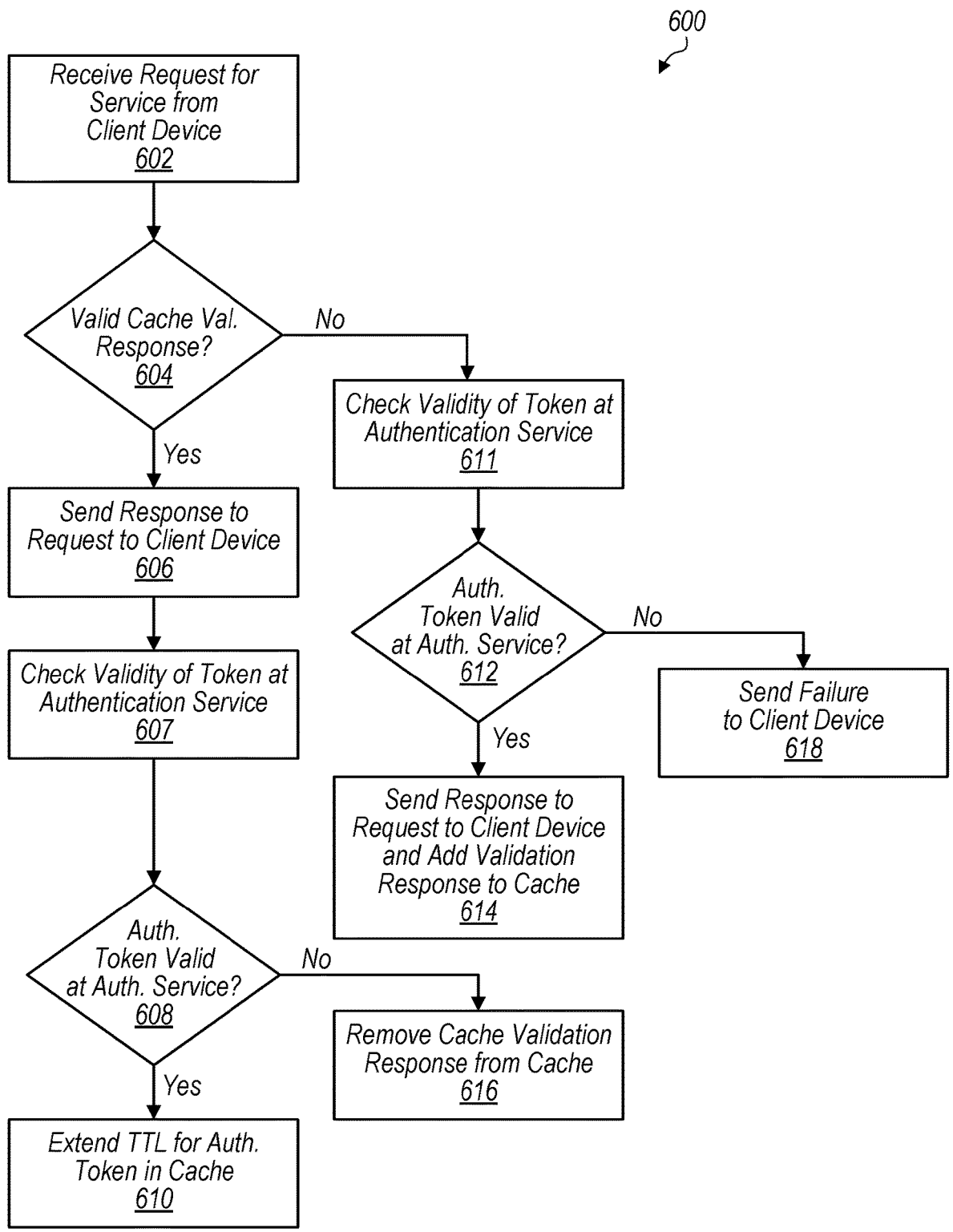
FIG. 6 is a flowchart of an example method of operation of a cache storing validation responses.

Turning now to FIG. 6, a flowchart 600 of an example method implemented by a server computer system is shown. Aspects of flowchart 600 are also found in FIGS. 7 and 8, which are described below. In the illustrated embodiment, at step 602, the server computer system (e.g., server computer system 120) receives a request for service (e.g., request for service 103) from a client device (e.g., client device 110). An authentication token may be included with or associated with the request. At step 604, the server computer system determines whether a valid cache entry exists in the cache (e.g., cache 130)—e.g., the entry's TTL value indicates that it is valid. A valid cache entry typically indicates that the entry has either been inserted into the cache or revalidated within a time period that may be equal to a token revocation grace period.

If a valid validation response exists in the cache, then at step 606 the server computer system handles the request by sending a response to the client device for the request for service without first checking the validity of the authentication token with the authentication service. If a cache entry with a valid TTL value does not exist in the cache, the server computer system, at step 611, checks the validity of the authentication token with the authentication service before processing the request for service. Steps subsequent to 611 are discussed further below after description of the flow following the transition from step 604 to 606.

After step 606, flow proceeds to step 607, in which the validity of the authentication token is checked with the authentication service. Having already responded to the request for service in step 606, the server computer system-to-authentication service latency is not passed to the client device. At step 608, the server computer system determines, based on a response from the authentication service, whether the authentication token is still valid. Note that because the token may have been revoked by authentication service 160 within the grace period, the response from authentication service 160 may indicate the token is invalid even though the cache had a valid entry for that token. If the token is still valid, in step 610, the server computer system causes the TTL value associated with the authentication token to be extended in the cache entry for the token (i.e., the cache entry is revalidated). As noted, the TTL value may be reset to the initial TTL time period, which may be equal or similar to a token revocation grace period. The action at step 610 thus extends the validity of the cache entry for a further period of time. If, however, it is determined at step 608 that the authentication token is not valid, the server computer system at step 616 causes the cache entry for the authentication token in the cache to be invalidated in the cache. In some cases, the entry may actually be evicted upon invalidation, while in other cases, the entry may simply be marked as invalid, with eviction occurring at some later point, such as routine cache maintenance.

As noted above, if the cache does not include a valid validation response, flow proceeds from step 604 to 611, in which the validity of the token is checked with the authentication service. At step 612, the server computer system determines whether the authentication token is valid according to the authentication service. If the token is valid, at step 614, the server computer system handles (or processes) the request for service, which entails sends the client device a response to the request for service, and also causes a cache entry corresponding to the authentication token to be added to the cache. In various embodiments, as part of addition of the cache entry, the server computer system sets the TTL value for the cache entry such that the cache entry is valid for some time period, which, as mentioned, may be roughly equal to the token revocation grace period. If, at step 612, the authentication token is determined to be invalid based on the response from the authentication service, then, the server computer system, at step 618, sends a failure message to the client device in response to the request for service.

Figure 7:
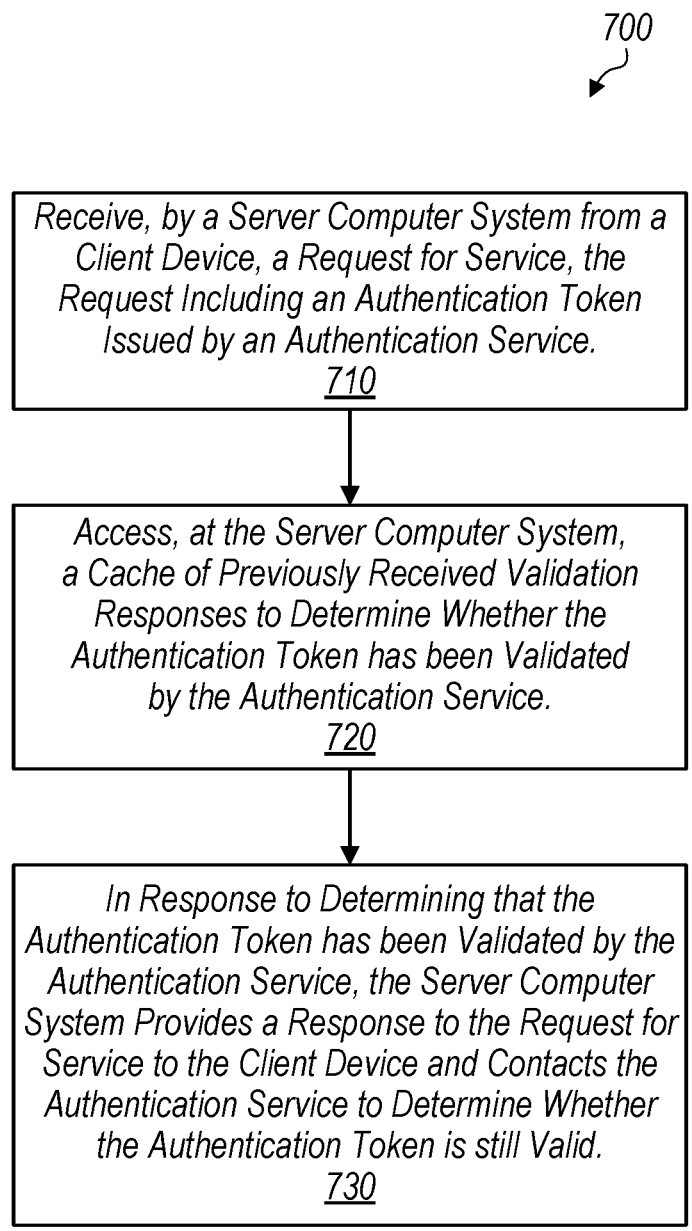
FIGS. 7-8 are flow diagrams of example methods of operations performed by a server system in handling a request for service from a client device.

Turning now to FIG. 7, a flow diagram of a method 700 is shown, corresponding to operations capable of being caused by execution of program instructions stored on a non-transitory computer readable medium. Method 700 is performed by a server computer system (e.g., server computer system 120) to handle a request for service (e.g., request for service 103) from a client device (e.g., client device 110).

Method 700 begins at step 710, with the server computer system receiving a request for service from the client device. The request includes an authentication token issued by an authentication service. In various embodiments, the handling of the request by the server computer system involves accessing proprietary information or resources by the server computer system. In some embodiments, the server computer system uses the authentication token to validate the request before accessing such information or resources.

At step 720, the server computer system accesses a cache of previously received validation responses to determine whether the authentication token has been validated by the authentication service. In various embodiments, each entry in the cache of validation responses includes an associated TTL. If the TTL value is unexpired, this indicates that the validation response is still valid. In many cases, a valid validation response in the cache indicates that the validation response was either first inserted into the cache or revalidated within a token revocation grace period (e.g., within the last 30 seconds).

At step 730, in response to determining that the cache validation response has been validated by the authentication service, the server computer system provides a response to the request for service to the client device. This response is provided without having to first contact the authentication service. In other words, the response is based on the validation response in the cache, and not on token validity information about the authentication token that is stored by the authentication service. This paradigm avoids the latency associated with contacting the authentication service, which may be large if the authentication service is coupled to the server computer system via a wide-area network. This would be especially true in scenarios when the latency is high relative to the time that it takes to handle a request. After providing the response to the request for service, step 730 continues with the server computer system contacting the authentication service to determine whether the authentication token is still valid, and if so, revalidate the validation response in the cache corresponding to the authentication token.

Figure 8:
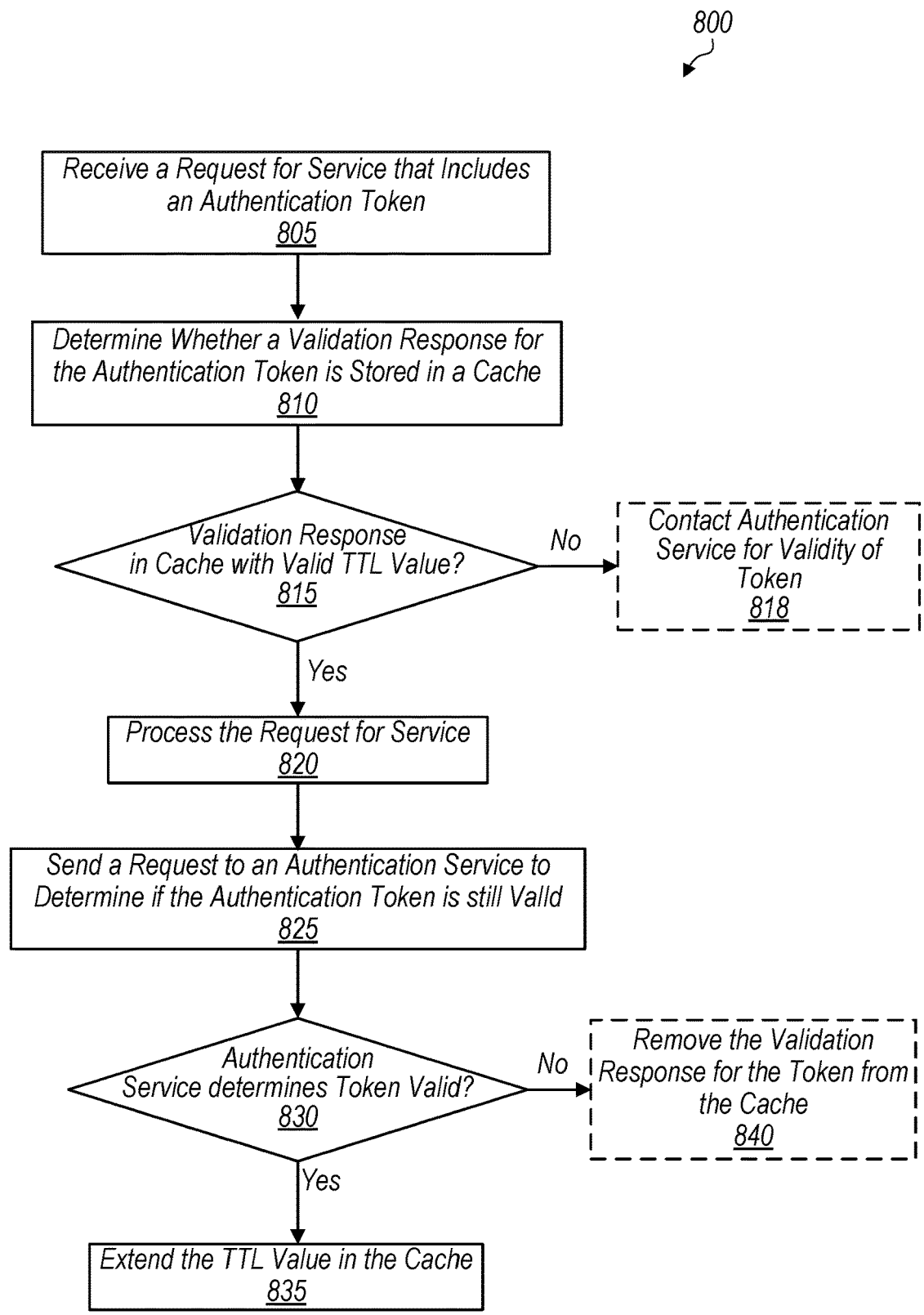

Turning now to FIG. 8, a flow diagram 800 corresponding to operations capable of being caused by execution of program instructions of a non-transitory computer readable medium is shown. Method 800 is one embodiment of operations that is performed by a server computer system (e.g., server computer system 120). Method 800 is another, more detailed formulation, of operations shown in method 700 described with respect to FIG. 7.

Method 800 begins at step 805 with the server computer system receiving a request for service that includes an authentication token. The request for service is received from a client device (e.g., client device 110). As discussed previously, the server computer system may want to check that the authentication token included in the request for service to be valid in order to protect proprietary information or resources on the server computer system. In some embodiments, the checking for validity of the authentication token involves a latency that corresponds to a significant performance penalty.

At step 810, the server computer system determines whether a validation response for the authentication token is stored in a cache of validation responses. This step may use the token name presented in the request for service to match with values in field token name 337 shown in FIG. 3. Next, in step 815, it is determined whether any matching entry is still valid. In various embodiments, a validation response is valid in the cache for a TTL period that, in some embodiments, is substantially equal to the token revocation grace period time. For example, the TTL period may have set based on the entry either being initially inserted into the cache or revalidated such that the TTL period is 30 seconds (or some other value). From the time the TTL period is set, the corresponding entry is valid in the cache for that period, and will expire unless the entry is revalidated upon a subsequent request for service with the same authentication token with the TTL period. Accordingly, when the request for service referred to in step 805 is received, the time value associated with that request may be compared to the time value associated with the TTL value in the cache; if the two values are within the TTL period, the entry is valid. In other implementations, when a cache entry is either inserted or revalidated, the TTL value may be set to a time value corresponding with the desired time of expiration—e.g., time of insertion of the entry plus the grace period. In this implementation, the time value associated with the request for service in step 805 can be compared to see if it is before or after the TTL value in the cache entry—if it is before the TTL value, the entry is valid. If the cache entry is not valid, the authentication service may be contacted for validation. This action is shown in step 818, which is indicated in dashed lines since the primary flow in method 800 illustrates the case in which a cache entry for a request for service is found to be valid (i.e., a transition from 815 to 820).

If the TTL value is valid, the server computer system proceeds with processing the request for service without first checking the validity of the authentication token with the authentication service at step 820. In some embodiments, being able to rely on the TTL value for a cache entry for the authentication token to be within a TTL period enables the server computer system to avoid a latency penalty associated with contacting the authentication service before validating the token.

At step 825, the server computer system sends a request to the authentication service to determine if the authentication token is still valid. At step 830, the server computer system determines, based on the response from the authentication service, whether the authentication token is still valid. In some embodiments, if the authentication token is valid, then at step 835, the server computer system extends the TTL value in the validation response corresponding to the authentication token such that the validation response (i.e., the cache entry) is valid for a further TTL period. If the authentication token is not valid, then the validation response is removed from the cache in step 840. Step 840 is shown in dashed lines because the primary flow shown in method 800 includes a transition from step 830 to 835. In an alternate flow, method 800 may transition from step 830 to 840.

Exemplary Computer System

Figure 9:
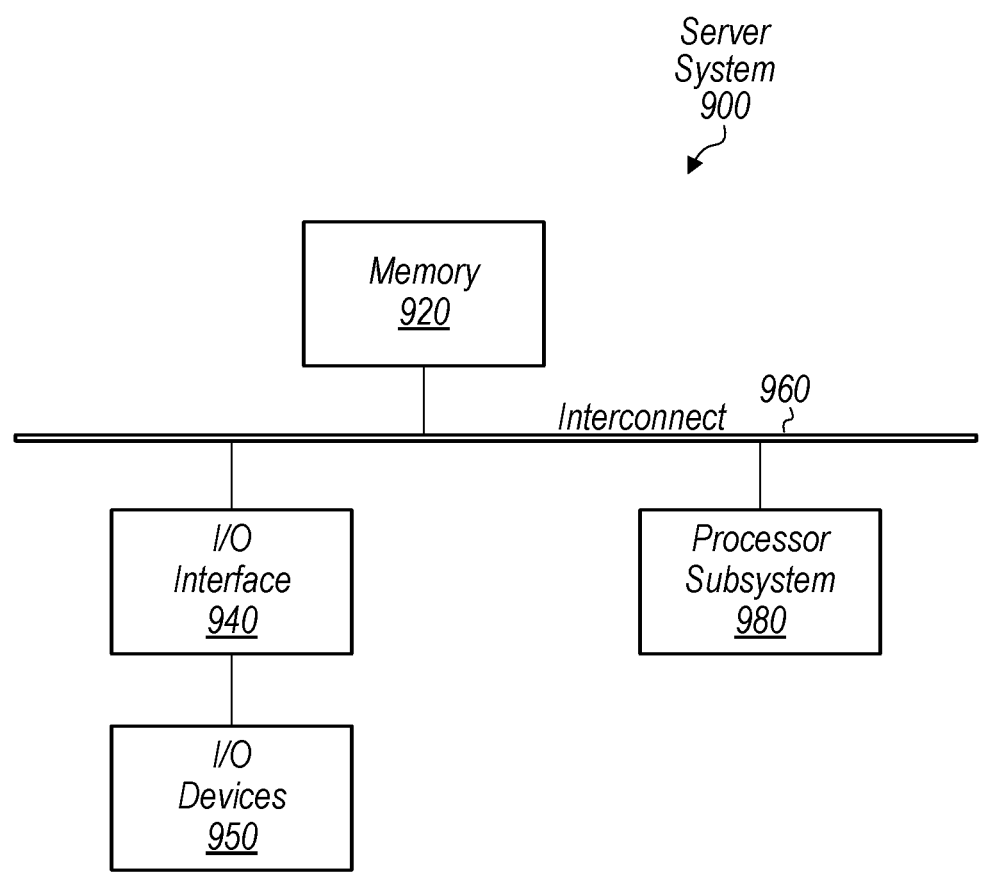
FIG. 9 is a block diagram illustrating an example computer system.

Turning now to FIG. 9, a block diagram of an exemplary computer system 900 is depicted. Computer system 900 may be representative of any of the various computer systems described in this disclosure, including client device 110, server computer system 120, and authentication service 160. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may include additional functionality other than what is indicated in FIG. 9. Thus, client device 110 may include the components shown in FIG. 9, but may take various forms including a personal computer system, desktop computer, laptop or notebook computer, tablet computer, handheld computer, mobile device, etc. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement a server computer system 120, an authentication service 160, and a cache 130 to store a validation response 133 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a server computer system from a client device, a request for service, wherein the request includes an authentication token issued by an authentication service;
   accessing, at the server computer system, a cache of previously received validation responses from the authentication service to determine whether one of the validation responses indicates that the authentication token has already been validated by the authentication service; and
   in response to determining that the cache includes a validation response indicating that the authentication token has already been validated by the authentication service, the server computer system:
      providing, to the client device, a response to the request for service, wherein the response is provided based on the validation response and not on token validity information about the authentication token that is stored by the authentication service; and
      contacting, as part of processing the request for service, the authentication service to determine whether the authentication token is still valid and should be revalidated; and
      in response to determining from the authentication service that the authentication token is still valid, extending a time period during which the validation response is valid.

2. The method of claim 1, wherein the validation response includes a time-to-live (TTL) value corresponding to a grace period that specifies a window during which the authentication token may be used to approve a particular request for service even if the authentication service is currently storing information indicating that the authentication token is no longer valid.

3. The method of claim 2, wherein the validation response includes a first time period during which the authentication token is valid, and wherein the TTL value indicates a second time period that is less than one percent of the first time period.

4. The method of claim 2, wherein the TTL value is configurable.

5. The method of claim 2, wherein the time period is equal to the grace period.

6. The method of claim 2, wherein the extending includes replacing the validation response in the cache with a new validation response from the authentication service, wherein the new validation response contains a TTL value that corresponds to the grace period for which the validation response is valid.

7. The method of claim 2, further comprising:
   in response to determining from the authentication service that the authentication token is not valid, deleting the validation response from the cache.

8. The method of claim 2, further comprising:
   maintaining the cache by periodically removing validation responses for which the TTL value has expired, wherein the removing is performed independently of a particular request for service from the client device.

9. The method of claim 2, further comprising:
   in response to receiving, by the server computer system, a different request for service that includes a different authentication token for which there is no validation response in the cache:
      accessing the authentication service to determine whether the different authentication token is valid; and
      in response to the authentication service indicating that the different authentication token is valid, inserting a validation response for the different authentication token into the cache, wherein the inserted validation response includes the TTL value.

10. The method of claim 1, further comprising:
    in response to receiving, by the server computer system, the validation response from the authentication service indicating that the authentication token is valid:
       storing, by the server computer system, a current timestamp as a TTL value for the authentication token.

11. A non-transitory computer-readable medium having program instructions stored thereon that are capable of causing a server computer system to perform operations comprising:
    receiving a request for service that includes an authentication token;
    determining whether a validation response for the authentication token is stored in a cache of validation responses; and
    in response to determining that the validation response for the authentication token is stored in the cache with an unexpired time-to-live (TTL) value:

providing a response to the request for service without having to contact an authentication service that previously provided the validation response;

sending a request to an authentication service to determine if the authentication token is still valid and should be revalidated; and in response to determining, from the authentication service, that the authentication token is valid, extending the TTL value in the cache; and in response to determining, from the authentication service, that the authentication token is not valid, removing the validation response from the cache.

12. The non-transitory computer-readable medium of claim 11, wherein the operations further comprise:

upon inserting a new validation response into the cache, setting the TTL value in the new validation response to indicate that the new validation response will expire, absent revalidation, after passage of a particular length of time; and in response to receiving a new request for service corresponding to the new validation response:

if the TTL value in the new validation response is unexpired:

responding to the new request for service without first contacting the authentication service; and in response to determining, based on information from the authentication service, that the new validation response is to be revalidated:

resetting the TTL value to indicate that the new validation response will expire, absent further revalidation, after passage of a particular length of time.

13. The non-transitory computer-readable medium of claim 11, further comprising:

in response to determining that the validation response for the authentication token is not stored in the cache:

sending a request to an authentication service to determine if the authentication token is valid; and in response to the authentication service indicating that the authentication token is valid:

processing the request for service; and adding a validation response for the authentication token in the cache with the TTL value set to indicate that the added validation response will expire, absent revalidation, after passage of a particular length of time.

14. The non-transitory computer-readable medium of claim 13, further comprising:

in response to determining that the authentication service indicates that the authentication token is not valid, sending a failure as a response to the request for service.

15. A system, comprising:

an authentication computer system configured to provide validation responses for authentication tokens, wherein at least some of the authentication tokens have an associated expiration value indicating a first length of time during which these authentication tokens are valid;

a requesting computer system configured to:

cache validation responses from the authentication computer system, wherein a particular validation response includes a time-to-live (TTL) value for a particular authentication token, the TTL value is originally set to a second length of time during which the particular authentication token may be used to approve requests for service even if the particular authentication token has been revoked by the authentication computer system;

receive a request for service that includes the particular authentication token; and in response to the particular validation response indicating that the particular authentication token has already been validated by the authentication computer system:

provide a response to the request for service without having to contact the authentication computer system; and contact the authentication computer system to determine whether the particular authentication token is still valid and should be revalidated; and in response to determining from the authentication computer system that the authentication token is still valid, extend a time period during which the validation response is valid.

16. The system of claim 15, wherein the first length of time is more than one hour, and wherein the second length of time is under one minute.

17. The system of claim 15, wherein the associated expiration value and the TTL value are configurable, and wherein the second length of time is less than one-tenth of the first length of time.

18. The system of claim 15, wherein the requesting computer system is configured to:

extend the time period by resetting the TTL value in the particular validation response to the second length of time.

19. The system of claim 15, wherein the authentication computer system is coupled to the requesting computer system via a wide-area network.

* * * * *